United States Patent
Ng et al.

(10) Patent No.: US 8,675,903 B2
(45) Date of Patent: Mar. 18, 2014

(54) ACOUSTIC PORTING FOR A PORTABLE COMMUNICATION DEVICE

(75) Inventors: Gim Pei Ng, Bayan Lepas (MY); Thean Hai Ooi, Batu Manung (MY); Cheah Heng Tan, Bayan Lepas (MY); Kheng Shiang Teh, Georgetown (MY); Huoy Thyng Yow, Perak (MY)

(73) Assignee: Motorola Solutions, Inc., Schaumburg, IL (US)

( * ) Notice: Subject to any disclaimer, the term of this patent is extended or adjusted under 35 U.S.C. 154(b) by 470 days.

(21) Appl. No.: 12/955,725

(22) Filed: Nov. 29, 2010

(65) Prior Publication Data
US 2012/0134304 A1    May 31, 2012

(51) Int. Cl.
*H04R 1/20*    (2006.01)

(52) U.S. Cl.
USPC ........... 381/345; 381/354; 381/351; 381/372; 181/149; 181/199

(58) Field of Classification Search
USPC ............. 455/569.1, 575.2; 379/430; 181/148, 181/149, 198, 199, 151; 381/87, 333, 334, 381/335, 345, 351, 354, 357, 182, 372, 122
See application file for complete search history.

(56) References Cited

U.S. PATENT DOCUMENTS

| 7,127,078 B2* | 10/2006 | Mann et al. ............ 381/326 |
| 7,505,602 B2 | 3/2009 | Eaton |
| 2008/0152183 A1* | 6/2008 | Janik et al. .............. 381/375 |
| 2008/0267438 A1* | 10/2008 | Chen et al. ............. 381/345 |

FOREIGN PATENT DOCUMENTS

EP    2114084 A1    4/2009

OTHER PUBLICATIONS

Brennan et al., Acoustic properties of rigid-frame porous materials—an engineering perspective, Jul. 2001, Elsevier Applied Acoustics, vol. 62, Issue 7, pp. 793-811.*
Internaitonal Search Report with Written Opinion to corresponding PCT/US2011/059582 application—mailed Feb. 1, 2012—11 pages.
"Extending Bass"; Electronics World, Nexus Media Communications, Swanley, Kent, G., vol. 100 No. 1695, Feb. 1994, pp. 100-105; XP000426418, ISSN: 0959-8332.

* cited by examiner

*Primary Examiner* — Curtis Kuntz
*Assistant Examiner* — Joshua Kaufman
(74) *Attorney, Agent, or Firm* — Barbara R. Doutre (57) ABSTRACT

A portable full duplex communication device (100) is provided with improved acoustic porting (114) by providing an earpiece enclosure (108) within the housing (102) of device. The earpiece enclosure (108) includes an array of micro-ports (114) formed to provide optimal low frequency response and echo performance without the use of external acoustical leak ports to the housing.

21 Claims, 5 Drawing Sheets

ACOUSTIC PORTING FOR A PORTABLE COMMUNICATION DEVICE

FIELD OF THE DISCLOSURE

The present disclosure relates generally to portable audio communication devices and more particularly to acoustic porting for such devices.

BACKGROUND

A portable audio communication device, such as a portable radio cellular telephone or the like, typically includes a speaker and a microphone. For radios providing full duplex communication, an earpiece enclosure may be utilized to minimize acoustic coupling to the microphone. However, the size of such an enclosure is limited by the size of the portable radio. Today's compact size portable devices do not provide sufficient space for an earpiece enclosure sufficiently large enough to faithfully reproduce an optimum low audio frequency response. In order to improve the low audio frequency response, acoustical leak ports are often used that lead to the earpiece enclosure. While the audio leak ports reduce the acoustical effect of the small enclosure, the audio leak ports can also cause water intrusion problems. Blocking the leak ports to prevent water intrusion can again cause a poor low audio frequency response.

Removal of the enclosure is not an option as this causes the audio signal to travel from the rear of the earpiece to the microphone thereby degrading the acoustic echo loss (AEL) performance. Poor acoustic echo loss causes conversation difficulties in full duplex calls.

Thus, the issues of echo suppression, fluid intrusion and low audio frequency response are all critical to the design of the acoustic porting of a portable full duplex communication device.

Accordingly, there is a need for a portable full duplex communication device with improved acoustic porting.

BRIEF DESCRIPTION OF THE FIGURES

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

Briefly, in accordance with various embodiments to be described herein, there is provided an apparatus for improved acoustic porting for a full duplex portable communication device. The use of an earpiece enclosure comprising an array of specially designed micro-ports minimizes echo in conjunction with a good low frequency response in a water-proof environment.

Figure 1:
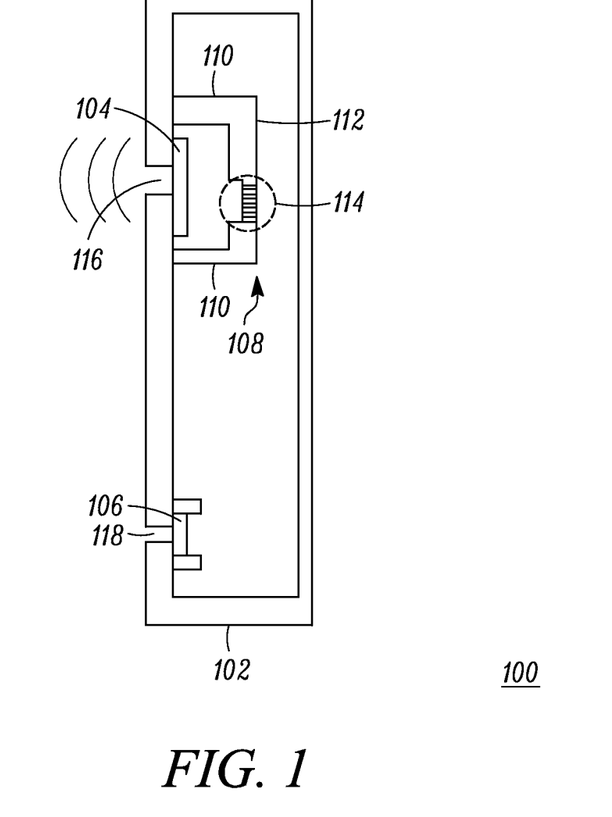
FIG. 1 is a simplified side cut-away view of a full duplex portable communication device having audio porting formed in accordance with various embodiments of the invention.

FIG. 1 is a simplified side cut-away view of a portable communication device 100 having audio porting formed in accordance with various embodiments of the invention. Portable communication device 100 is formed of a housing 102 within which is located a speaker 104 mounted behind a speaker port 116 and a microphone 106 mounted behind a microphone port 118. Full duplex capability is provided to portable communication device 100 by known or yet to be developed transceiver electronics (not shown). In accordance with an embodiment, an earpiece enclosure 108 having side walls 110 and a back wall 112 enclose the back surface of the speaker 104 within the housing 102. In accordance with the embodiment, the earpiece enclosure 108 comprises an array of micro-ports 114 on the back wall 112. The array of micro-ports 114 is formed to minimize acoustic coupling from the speaker 104 to the microphone 106. The array of micro-ports 114 is formed to provide a predetermined low frequency response with optimized echo suppression, thereby eliminating the need for any external acoustical leak ports on the housing 102.

Figure 2A:
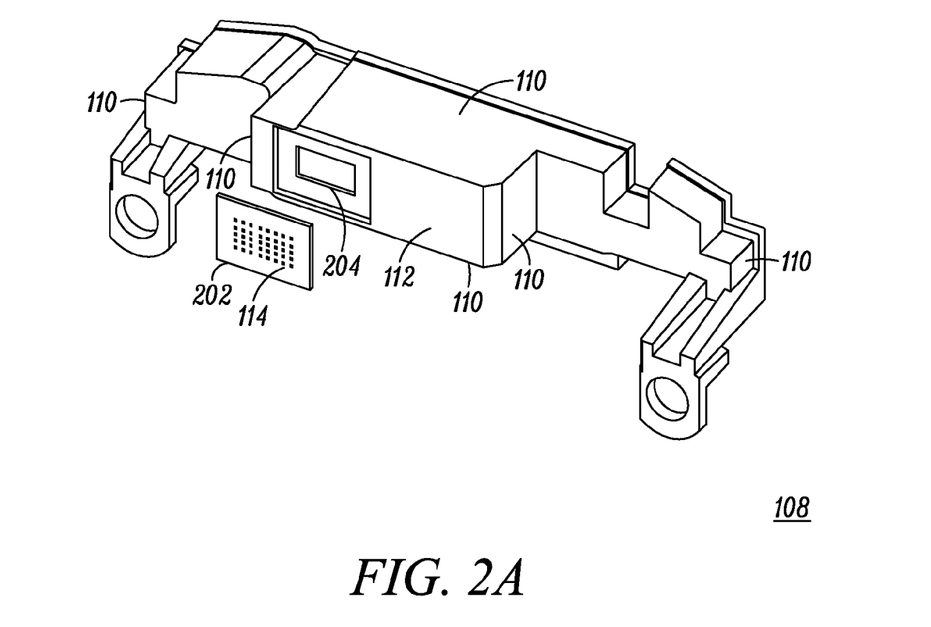
FIGS. 2A and 2B show more detailed perspective views of an earpiece having the audio porting in accordance with various embodiments of the invention.
Figure 2B:
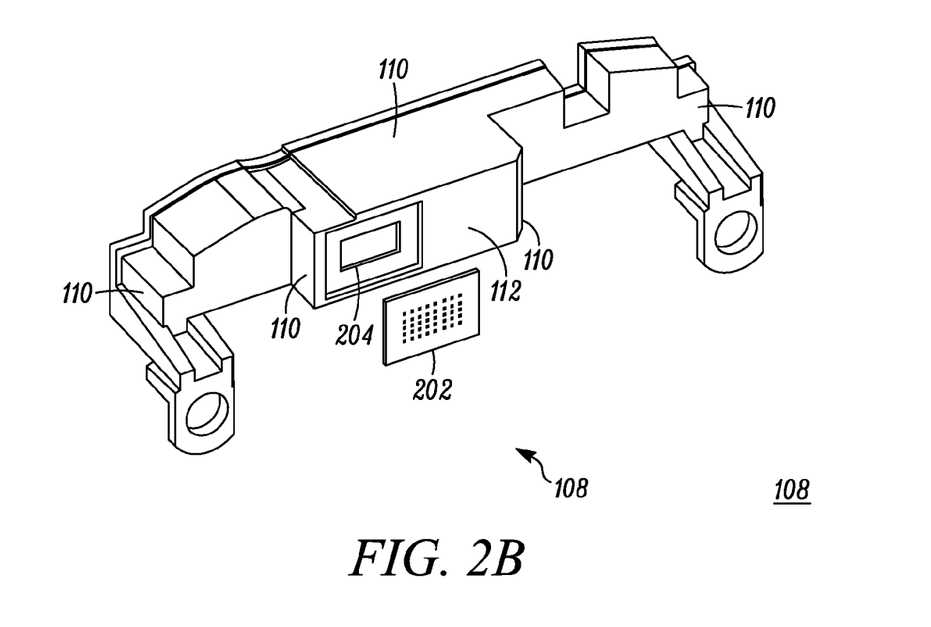

FIGS. 2A and 2B show an example of a more detailed view of the earpiece enclosure 108 formed in accordance with an embodiment. As seen in this view, the array of micro-ports 114 can be formed on a separate substrate 202 which is insertable and removable from a recessed aperture 204 formed within the back wall 112 of the earpiece enclosure 108. The substrate 202 is formed of a high density material, such as stainless steel, brass or the like. The micro-ports 114 are drilled out from the high density material to provide high mass inertance micro-ports. Mass inertance is a term used to describe the effect of inertia due to the acoustic mass formed by the array of micro-ports 114. The acoustic mass of a port is a function of the length (L) and diameter (D) of the micro-ports. In accordance with the embodiment, the dimensions of the micro-ports 114 are formed to provide a predetermined low frequency acoustic response with optimum echo suppression. As previously stated, the substrate 202 is made of high density material(s). While the walls 110, 112 may also be formed of the same or similar high density material as the substrate 202, it is also possible to use other less dense materials like plastic, similar to the material typically used for the radio housing 102, for the walls 110, 112. As seen in FIGS. 2A, 2B, the earpiece enclosure 108 can comprise a plurality of side walls 110, as opposed to a box-like structure. The form-factor of the earpiece enclosure 108 is based on the internal form-factor and spacing within the radio housing 102. In accordance with the embodiment, the only element enclosed by earpiece enclosure 108 is the speaker 104 (as was shown in FIG. 1).

Figure 3A:
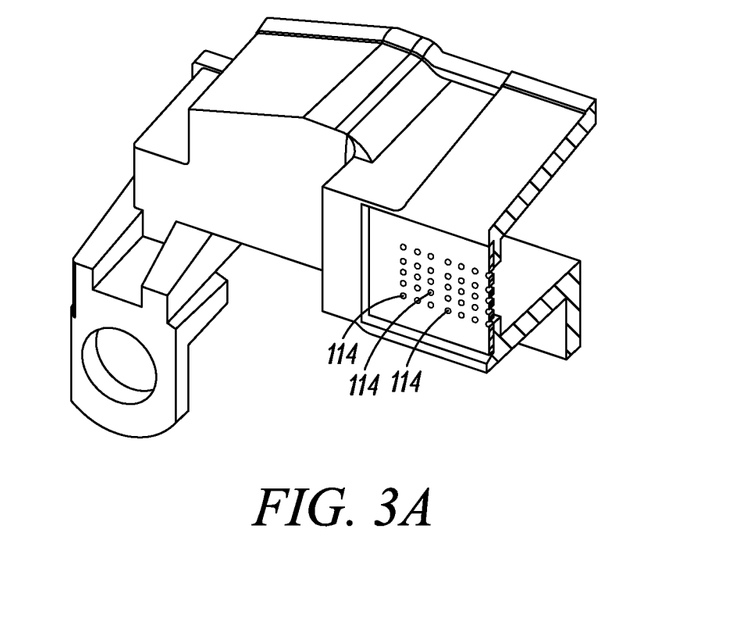
FIGS. 3A and 3B show a cut-away view of the earpiece of FIG. 2 in accordance with various embodiments of the invention.
Figure 3B:
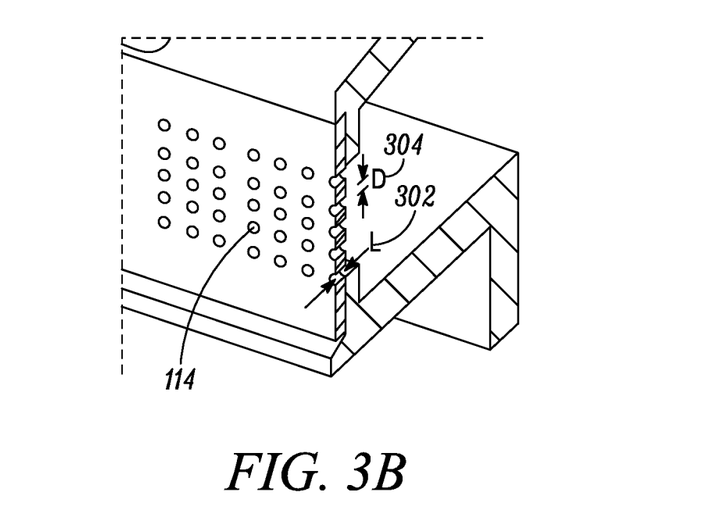

FIGS. 3A and 3B show cut-away views of the earpiece of FIG. 2A in an assembled state. These views show substrate 202 having the array of micro-ports 114 forming a grill-like structure wherein each micro-port 114 has a predetermined length 302 and predetermined diameter 304. As previously mentioned, the array of micro-ports 114 are high mass inertance micro-ports. The substrate 202 having the array of high mass intertance micro-ports 114 is a single piece part that is very easy to manufacture and very easy to assemble to the earpiece enclosure 108, thus facilitating the manufacturing and assembly process of the portable communication device 100. While a single block style earpiece enclosure 108 can be used, the embodiments of FIGS. 2A and 2B and FIGS. 3A and 3B further illustrate how the earpiece enclosure 108 with micro-ports 114 can be readily incorporated as part of internal housing components further facilitating ease of assembly and manufacturability.

While the earpiece enclosure 108 shown in FIGS. 2A and 2B has an air volume of approximately one cubic centimeter (1 cc), the geometry of the micro-ports 114 can vary within predetermined ranges and still achieve effective acoustical results. For example, each micro-port can be within a range of 0.1 mm and 0.5 mm, the length of the port can be within a range of 0.1 mm and 0.5 mm, for a range of ports from 10 to 100 ports. Table 1 below summarizes ranges of effective dimensions.

TABLE 1

| Parameters | Dimension |
| --- | --- |
| Diameter of Port, D (mm) | 0.1 ≤ D ≤ 0.5 |
| Length of Port, L (mm) | 0.1 ≤ L ≤ 0.5 |
| Number of Ports, N (mm) | 10 ≤ N ≤ 100 |

The identified geometry of the micro-ports 114 can be used for other earpiece enclosures having different air volumes. The identified geometry of the micro-ports 114 is particularly well suited to a radio housing providing full duplex capability, as these types of radios provide a sufficiently large air volume that will not affect the operation of the speaker.

Figure 4:
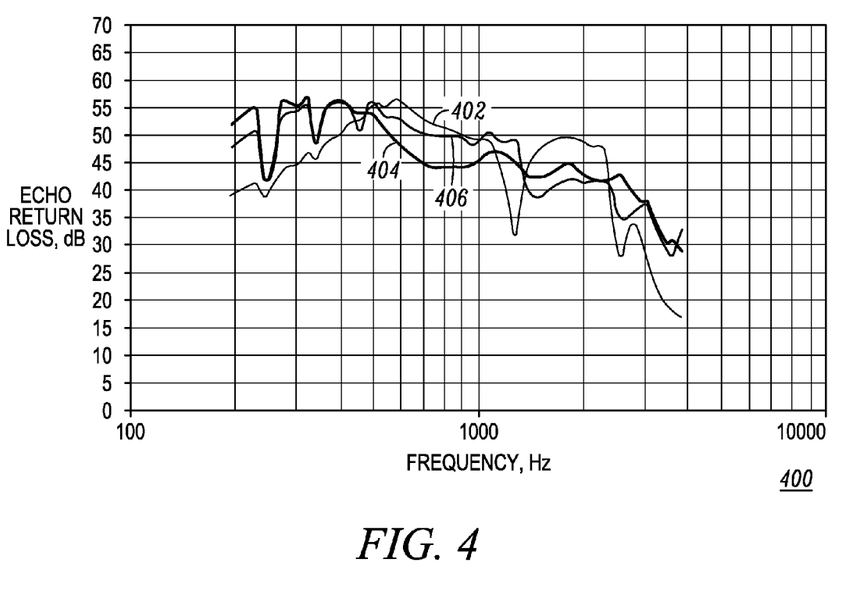
FIG. 4 is a graphical example of echo return loss data taken for a portable communication device formed and operating in accordance with various embodiments of the invention.

An example of measured performance results that were achieved for an earpiece enclosure formed in accordance with the embodiments is shown in FIG. 4. Graph 400 shows acoustic echo loss (AEL) for an earpiece enclosure of approximately 1 cc and having an array of micro-ports with the diameter (D), length (L), and number of micro-ports (N) as outlined in Table 2.

TABLE 2

| Parameters | Dimension |
| --- | --- |
| Diameter of Port, D (mm) | 0.15 |
| Length of Port, L (mm) | 0.30 |
| Number of Ports, N (mm) | 40 |

Response 402 was taken under the condition in which the rear of the enclosure is completely open. Response 402 measured an AEL=35.30 dB. Response 404 was taken under the condition in which the rear volume of the earpiece enclosure was completely sealed. Response 404 measured an AEL=43.41 dB. Response 406 was taken under the condition in which the rear volume of the earpiece enclosure was sealed with the optimum high mass inertance micro-ports formed in accordance with the above dimensions. Response 406 measured an AEL=42.16 dB. Thus, an improvement of close to 7 dB in terms of AEL is seen with the earpiece enclosure have the array of micro-ports as compared to an open environment.

Figure 5:
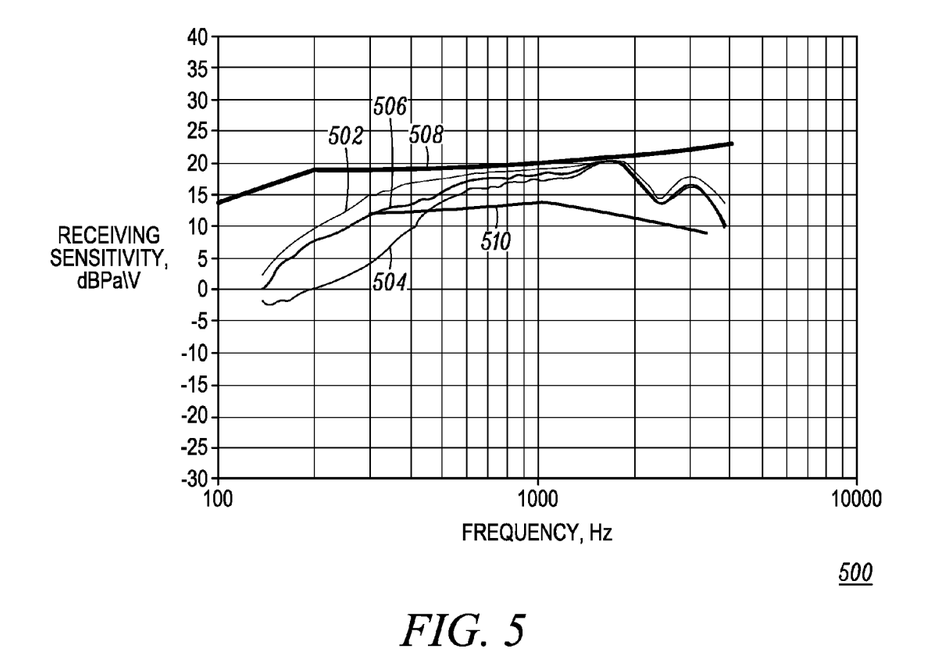
FIG. 5 is a graphical example of receive sensitivity data taken for a portable communication device formed and operating in accordance with various embodiments of the invention.

FIG. 5 shows a receive sensitivity graph 500 measured under the same porting conditions outlined for graph 400. Response 502 provides receive sensitivity without a rear volume seal. Response 504 shows receive sensitivity with a complete rear volume seal. Response 506 shows receive sensitivity for the earpiece enclosure having the high mass inertance micro-ports of Table 2. These responses 502, 504, 506 are compared to an upper limit 3GPP receive mask 508 and a lower limit 3GPP receive mask 510. Although response 502 has a good low frequency response which falls within the mask limits 508, 510, response 502 but had poor echo loss as shown by graph 400. Response 504 shows a poor low frequency response failing to fall within the mask limits. Response 506 falls within the mask limits 508, 510, and as was shown in FIG. 4, had good acoustic echo loss.

The graphs 400 and 500 demonstrate an example of how the earpiece enclosure formed in accordance with the embodiments can address two of the three critical design parameters—echo loss and low frequency response. The fact that no external acoustical leak ports are used in these embodiments further meets the third criteria of water/fluid protection to the housing.

Accordingly, there has been provided a portable communication device with acoustic porting that addresses all three critical design parameters by providing echo minimization, good low audio frequency response and prevention of fluid intrusion. The array of high mass inertance micro-ports incorporated into the acoustical porting negates the need for complex DSP algorithms and avoids the use of complicated assemblies.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A portable full duplex communication device, comprising:
   a housing without external acoustical leak ports, the housing having a speaker and a microphone, the speaker having front and back surfaces; and
   an earpiece enclosure having side walls and a back wall for enclosing the back surface of the speaker within the housing, the earpiece enclosure having an array of micro-ports on the back surface formed to minimize acoustic coupling between the speaker and the microphone.

2. The portable full duplex communication device of claim 1, wherein the earpiece enclosure has an air volume of approximately 1 cubic centimeter (1 cc) and wherein each micro-port of the array of micro-ports has a diameter within 0.1 millimeters (mm) and 0.5 mm, each micro-port has a length within 0.1 mm and 0.5 mm, and wherein the array of micro-ports comprises between 10 and 100 micro-ports.

3. The portable full duplex communication device of claim 1, further comprising:
   a substrate within which is formed the array of micro-ports, the substrate comprising a material within which is formed the array of micro-ports to provide high mass inertance micro-ports.

4. The portable full duplex communication device of claim 3, wherein the high mass inertance micro-ports have a predetermined range of parameters for a predetermined air volume.

5. The portable full duplex communication device of claim 4, wherein the predetermined range of parameters comprises: port diameter range, port length range, and number of ports range.

6. The portable full duplex communication device of claim 5, the predetermined range of parameters provides echo minimization and a low audio frequency response, while the housing without external acoustical leak ports prevents fluid intrusion.

7. The portable full duplex communication device of claim 1, wherein the array of micro-ports has a predetermined number and is dimensioned to have a predetermined length and a predetermined diameter drilled within a metal substrate to minimize echo between the speaker and the microphone while providing a predetermined low frequency response without the use of external acoustical leak ports on the housing.

8. The portable full duplex communication device of claim 1, wherein the array of micro-ports comprises high mass inertance micro-ports.

9. The portable full duplex communication device of claim 1, wherein the array of micro-ports comprises high mass inertance micro-ports forming an acoustic mass.

10. The portable full duplex communication device of claim 1, wherein the array of micro-ports forms an acoustic mass.

11. The portable full duplex communication device of claim 10, wherein the acoustic mass of the array of microports is a function of the length (L) and diameter (D) of the micro-ports.

12. A portable communication device, comprising:
    a housing having an earpiece port and a microphone port;
    a speaker coupled to the housing facing the earpiece port;
    a microphone coupled to the housing facing the microphone port;
    an earpiece enclosure comprising side walls and a back wall, the back wall having an aperture formed therein for mounting behind the speaker;
    a substrate for mounting to the aperture of the earpiece enclosure, the substrate comprising an array of micro-ports; and
    the array of micro-ports being formed to minimize echo between the speaker and the microphone while providing a predetermined low frequency response without the use of external acoustical leak ports on the housing.

13. The portable communication device of claim 12, wherein the array of micro-ports is formed of high mass inertance micro-ports wherein the high mass inertance micro-ports are formed of a predetermined length and diameter.

14. The portable communication device of claim 12, wherein each micro-port has a diameter within 0.1 millimeters (mm) and 0.5 mm and a length within 0.1 mm and 0.5 mm, and wherein the array of micro-ports comprises between 10 and 100 micro-ports.

15. The portable communication device of claim 14, wherein the earpiece enclosure has an air volume of less than one cubic centimeter (1 cc).

16. The portable communication device of claim 12, wherein the substrate having the array of micro-ports is insertable and removable from the earpiece enclosure.

17. The portable communication device of claim 12, wherein the portable communication device is a full duplex communication device.

18. The portable communication device of claim 12, wherein the substrate comprises metal substrate and the array of micro-ports formed therein are high mass inertance micro-ports formed of a predetermined number of ports, predetermined length and predetermined diameter.

19. The portable communication device of claim 12, wherein the housing without external acoustical leak ports prevents fluid intrusion to the portable communication device.

20. A portable full duplex communication device, comprising:
    a housing without external acoustical leak ports, the housing having a speaker and a microphone, the speaker having front and back surfaces; and an earpiece enclosure having side walls and a back wall for enclosing the back surface of the speaker within the housing, the earpiece enclosure having an array of micro-ports on the back surface formed to minimize acoustic coupling between the speaker and the microphone, wherein the array of micro-ports is formed of a predetermined length and diameter, and wherein the predetermined diameter is 0.15 mm, and the predetermined length is 0.30 mm for an array of 40 micro-ports, and wherein the earpiece enclosure has an air volume of approximately one cubic centimeter (1 cc).

21. The portable full duplex communication device of claim 20, wherein the housing without external acoustical leak ports prevents fluid intrusion to the portable full duplex communication device.

* * * * *

UNITED STATES PATENT AND TRADEMARK OFFICE
CERTIFICATE OF CORRECTION

PATENT NO. : 8,675,903 B2
APPLICATION NO. : 12/955725
DATED : March 18, 2014
INVENTOR(S) : Ng et al.

It is certified that error appears in the above-identified patent and that said Letters Patent is hereby corrected as shown below:

On the title page

Item 75, under "Inventors", in Column 1, Line 2, delete "Batu Manung" and insert
-- Batu Maung --, therefor.

Item 56, under "OTHER PUBLICATIONS", in Column 2, Line 4, delete "Internaitonal" and insert
-- International --, therefor.

In the specification

In Column 3, Line 11, delete "intertance" and insert -- inertance --, therefor.

Signed and Sealed this
Third Day of May, 2016

Michelle K. Lee
*Director of the United States Patent and Trademark Office*